INVENTOR.
L. D. KLEISS
BY Hudson & Young
ATTORNEYS

INVENTOR.
L. D. KLEISS
BY Hudson & Young
ATTORNEYS

INVENTOR.
L. D. KLEISS
BY Hudson + Young
ATTORNEYS

United States Patent Office 3,174,298
Patented Mar. 23, 1965

3,174,298
PROCESS CONTROLLER
Louis D. Kleiss, Borger, Tex., assignor to Phillips Petroleum Company, a corporation of Delaware
Original application Mar. 25, 1957, Ser. No. 648,292. Divided and this application Jan. 2, 1962, Ser. No. 163,807
9 Claims. (Cl. 62—211)

This invention relates to improved process controllers which employ two or more sensing elements to measure process input and/or intermediate variables in addition to the final controlled variable.

This application is a division of copending application Serial No. 648,292, filed March 25, 1957, now abandoned.

In nearly all fields of industry, automatic controllers are used extensively to regulate processes to obtain high purity products and more efficient operation. At the present time, cascade and ratioed input control systems are finding increased favor in the control of processes which are influenced by more than one variable. The process is controlled by manipulation of one of these variables which is designated as the controlled variable. Other input variables are controlled or compensated by cascade and ratioed input control systems so that their effects on the system are negligible.

The controller of the present invention makes no attempt to control or compensate directly any input variable other than the controlled input variable. Instead, variables other than the controlled variable are measured, and conventional memory sections, such as rate action and reset rate, are employed to compute the future effects of these variables on the process. The outputs of these memory sections are applied as negative feedback to the controller amplifier so that the controlled input variable is adjusted to anticipate the effects of any changes. The quality of the control obtained by the apparatus of this invention is comparable to that obtained by the more costly and complex cascade and ratioed input control systems. Only a single controller is required in place of the several controllers needed in the prior systems. This results in substantial economies in cost, installation and maintenance. The controller of this invention can utilize conventional control mediums, such as electrical or pneumatic signals. Conventional controllers which are presently available commercially can readily be modified to provide controllers in accordance with this invention.

Accordingly, it is an object of this invention to provide an improved controller which compensates for changes in variables other than the primary controlled variable.

Another object is to provide an improved controller which is relatively inexpensive and which is capable of producing quality of control comparable to that provided by more expensive and complex systems.

A further object is to provide an improved controller which can readily be constructed by modifying existing controllers which are commercially available.

Other objects, advantages and features of this invention should become apparent from the following detailed description which is taken in conjunction with the accompanying drawing in which.

Figure 1:
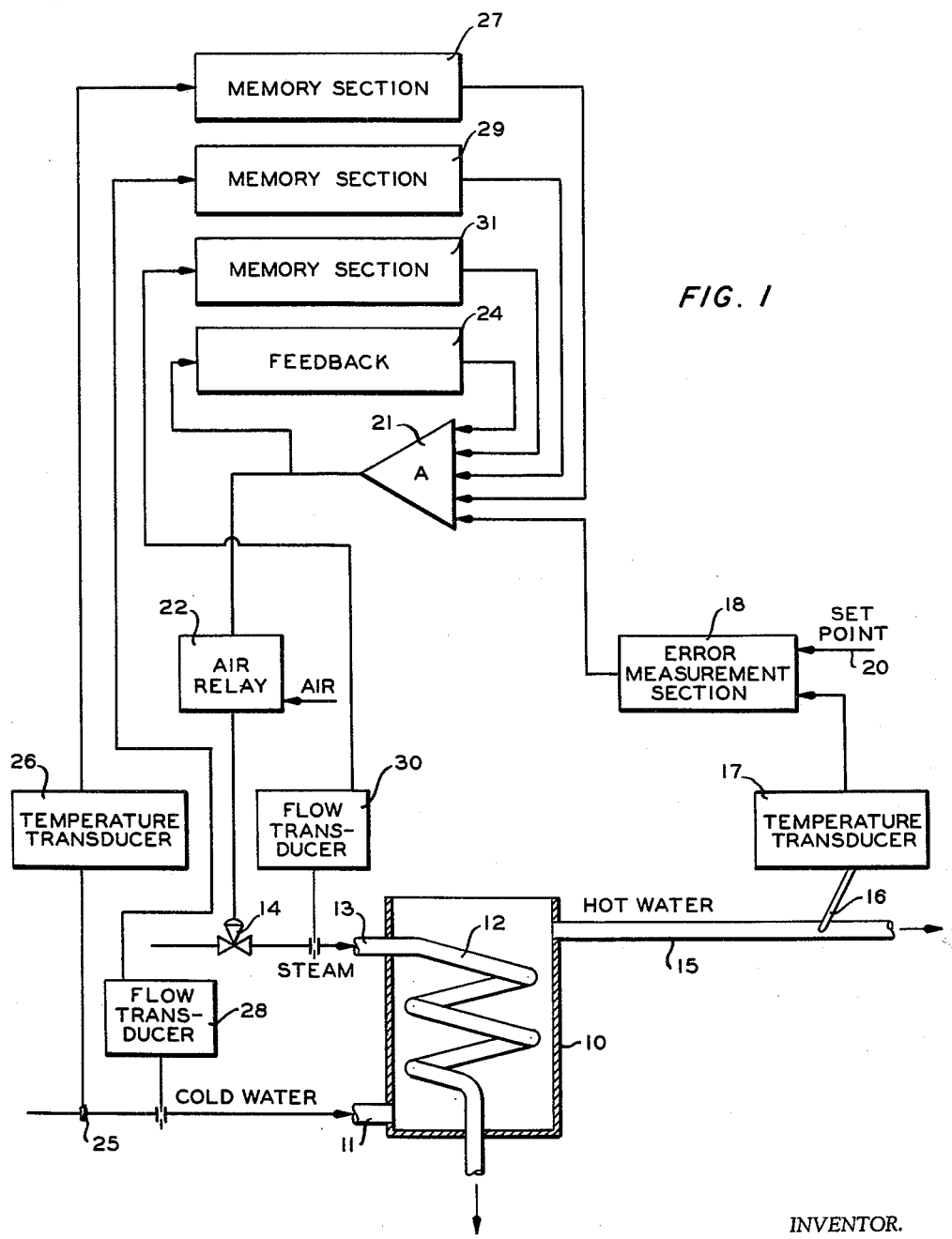
FIGURE 1 is a schematic representation of a first embodiment of the control system of this invention.

Referring now to the drawing in detail and to FIGURE 1 in particular, there is shown a control system for a water heating process. Cold water is introduced into a tank 10 through an inlet conduit 11. A steam coil 12 is disposed within tank 10 to provide the required heat. Steam is introduced into coil 12 through a conduit 13 which has a control valve 14 therein. The heated water is removed through an outlet conduit 15. A temperature sensing element 16 is disposed within outlet conduit 15 to indicate the temperature of the heated water. Sensing element 16 is connected to a transducer 17 which provides a first output signal that is representative of the water temperature. This signal can be an electrical voltage or a pneumatic pressure, for example. The output signal of transducer 17 is applied as the first input to the error measurement section 18 of the controller. The signal is therein compared with a second input set point signal 20 which represents the desired temperature of the water in outlet conduit 15. As long as the water temperature remains at the set value, there is a zero output signal from measurement section 18. However, if the measured temperature should deviate in either direction from the set value, measurement section 18 provides an output signal which is representative of this deviation. This signal is applied to the input of an amplifier 21. The output signal of amplifier 21 is applied to control valve 14 to adjust the flow rate of steam into coil 12. For example, if the temperature of the outlet water should decrease, additional steam is supplied to coil 12. In the illustrated control system, valve 14 is operated by a pneumatic pressure which is provided by an air relay 22. The output signal of amplifier 21 adjusts the output pressure of relay 22.

It should be evident that the operation of the control system of FIGURE 1 is not instantaneous. For purposes of discussion, it will be assumed that tank 10 contains 100 pounds of water. Water at a temperature of 60° F. is supplied to the tank through conduit 11. Steam is supplied to coil 12 at a rate of one pound per minute. The latent heat of the steam is assumed to be 1000 B.t.u.'s per pound. It is further assumed that outlet conduit 15 contains twenty pounds of water between tank 10 and sensing element 16. The temperature of the outlet water is 110° F. If the steam flow should suddenly be increased to two pounds per minute, the temperature of the outlet water eventually rises to 160° F. This is 100% response and involves a series of events. The steam pressure in the heating coil rises toward an equilibrium value in accordance with the following relationship:

$$\frac{P}{P_2 - P_1} = 1 - e^{-\frac{t}{T}}$$

where:

$P$ = pressure rise
$P_2$ = final pressure
$P_1$ = initial pressure
$T$ = time constant (1 minute)
$t$ = time elapsed since steam flow change
$e$ = 2.71828.

This introduces the first time lag into the system.

The second time lag to be considered is that involved in the transfer of heat from the surface of the heating coil to the body of water in tank 10. Since the tank holds 100 pounds of water and the flow rate is 20 pounds per minute, the time constant is 5 minutes. Assuming an instantaneous change in the heating coil skin temperature and instantaneous mixing, the temperature of the water in the tank rises according to the same general exponential formula as for the steam pressure rise, except that the time constant is 5 minutes.

Figure 2:
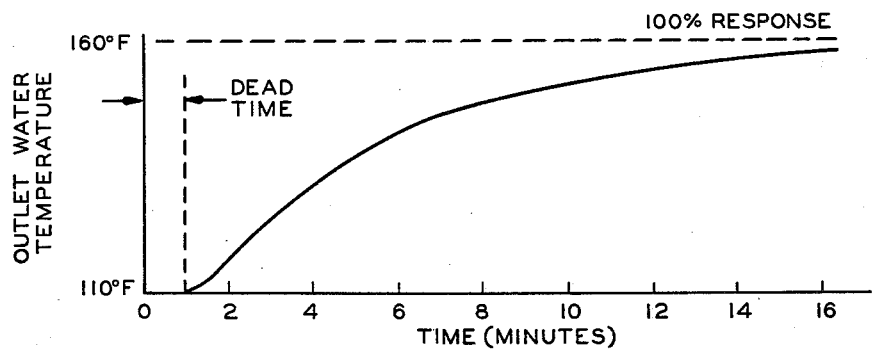
FIGURE 2 is a graphical representation of a process response to a sudden and sustained input change.

In addition to these two time lags, the process has 1 minute of dead time because of the transportation lag. This is due to the fact that there is 20 pounds of water in the outlet conduit and the flow is 20 pounds per minute. The total process response can be calculated by multiplying the percentage of the two process lag responses at any instant of time and adding one minute for dead time. This composite lag is illustrated in FIGURE 2.

From the foregoing, it should be evident that a control system employing only a single sensing element and means to adjust a variable in response thereto is not capable of providing a smooth control. The control system of the type thus far described in conjunction with FIGURE 1 results in substantial overshooting of the desired outlet temperature. However, in order to compensate for the process lags, conventional controllers are provided with feedback systems to reduce the effects of such lag. This is illustrated schematically in FIGURE 1 by a feedback network 24 which is connected between the output and input of amplifier 21. Such a network can include both reset and rate adjustment mechanisms to provide both positive and negative feedback.

Reset and rate networks compare an input signal with a time weighted average of past input signals. The output signal thus developed is a time weighted average of changes in the network input signal, the later changes having the most profound effect. Signal averaging is done with restrictions such as needle valves or resistors in combination with energy storage devices such as air tanks or capacitors. Time weighting of stored signals is accomplished by flow of energy to and from the energy storage devices at a rate determined by energy potentials and the time constants of the networks. Reset feedback networks, or a combination of reset and rate networks, will be recognized in the electrical art as filters. This is because their primary function is to transmit changes in the input signal rather than long term values. Many configurations of reset and rate networks are familiar to those skilled in the controller art, and need not be described in detail. It is sufficient to point out that these neworks are used in conrollers to receive a signal representing a process input variable, and to transmit a signal predicting the effect of changes in this process input variable upon the process. The network output signal is used to modify controller action. The feedback of a controller with reset may be expressed mathematically as some variation of the formula:

$$\frac{\text{Output from reset network}}{\text{Change in input to reset network}} = e^{-\frac{t}{T}}$$

where $e = 2.71828$
$t =$ time elapsed since input change
$T =$ time constant of networks A convenient way to consider reset and rate functions in the controller is lumped together to form a memory section. This composite remembers process input changes for the length of time it takes the effect of such changes to appear in the process measurement. The memory section output, representing process changes in transit, opposes the effect of the error signal and thus influences controller action.

The control system thus far described operates in a reasonably satisfactory manner if all the process input variables except the regulated variable are stable or have no effect on the process. This assumes, for example, that the cold water enters tank 10 at a constant rate and at a constant temperature. However, these assumptions are not always true in practical control systems. In accordance with the present invention, a system is provided which is capable of compensating for changes in these other variables. A second temperature sensing element 25 is disposed in inlet conduit 11 to provide a measurement representative of the temperature of the inlet water. The output signal of element 25 is converted into an appropriate analog signal by means of a temperature transducer 26. The output signal of transducer 26 is applied through a memory section 27 as negative feedback to amplifier 21. A flow transducer 28 provides an analog signal which is representative of the rate of flow of water through conduit 11. The output signal of transducer 28 is applied through a memory section 29 as negative feedback to amplifier 21. A second flow transducer 30 provides an output signal which is representative of the actual flow of steam through conduit 13. This signal is applied through a third memory section 31 as negative feedback to amplifier 21.

In the improved control system of FIGURE 1, feedback network 24 is employed to anticipate the effect of controller output on the steam flow. This section requires only a short memory because this signal dies out as the steam flow increases. Feedback section 24 utilizes conventional internal feedback, and may be omitted in some applications because a change in steam flow rate resulting from an amplifier output change is so rapid in comparison with other process responses that very little error is introduced by omitting this section. However, this would not be true if the steam flow response were slow in comparison with the process response, as could occur, for example, if a sluggish control valve were employed in conjunction with a tube heater of small water capacity.

Memory section 31 receives an analog signal representative of the actual steam flow rate and computes that part of this variable which has not had time to appear in the measured output water temperature. Memory section 31 applies an analog signal representing this portion to the amplifier input as negative feedback. In this regard, it should be noted that other types of sensing elements can be employed for this purpose. For example, a sensing element can be employed to measure the pressure or temperature of the steam within the heating coil to provide such information.

Memory sections 27 and 29 receive analogs of the inlet water temperature and flow rates, respectively. These sections predict the effects of changes in these variables on the output water temperature and apply negative feedback signals representative of these predictions to the amplifier input. Corrections can be made in this manner for changes in inlet water temperature or flow rates before their effects are measured by sensing element 16. For example, if the temperature of the inlet water should decrease, additional steam is required in coil 12 to maintain the desired outlet water temperature. This is provided by memory section 27 which decreases the amount of negative feedback signal to amplifier 21 to open valve 14 a greater extent. Similarly, memory section 29 adjusts the steam to compensate for changes in temperature of the inlet water. It should be obvious that the number of memory sections can be reduced if there are fewer input variables in the process or if exact control is not required.

The memory sections employed in this invention compare an input signal against a time weighted average of past input signals to provide a time weighted average of signal differences.

Figure 3:
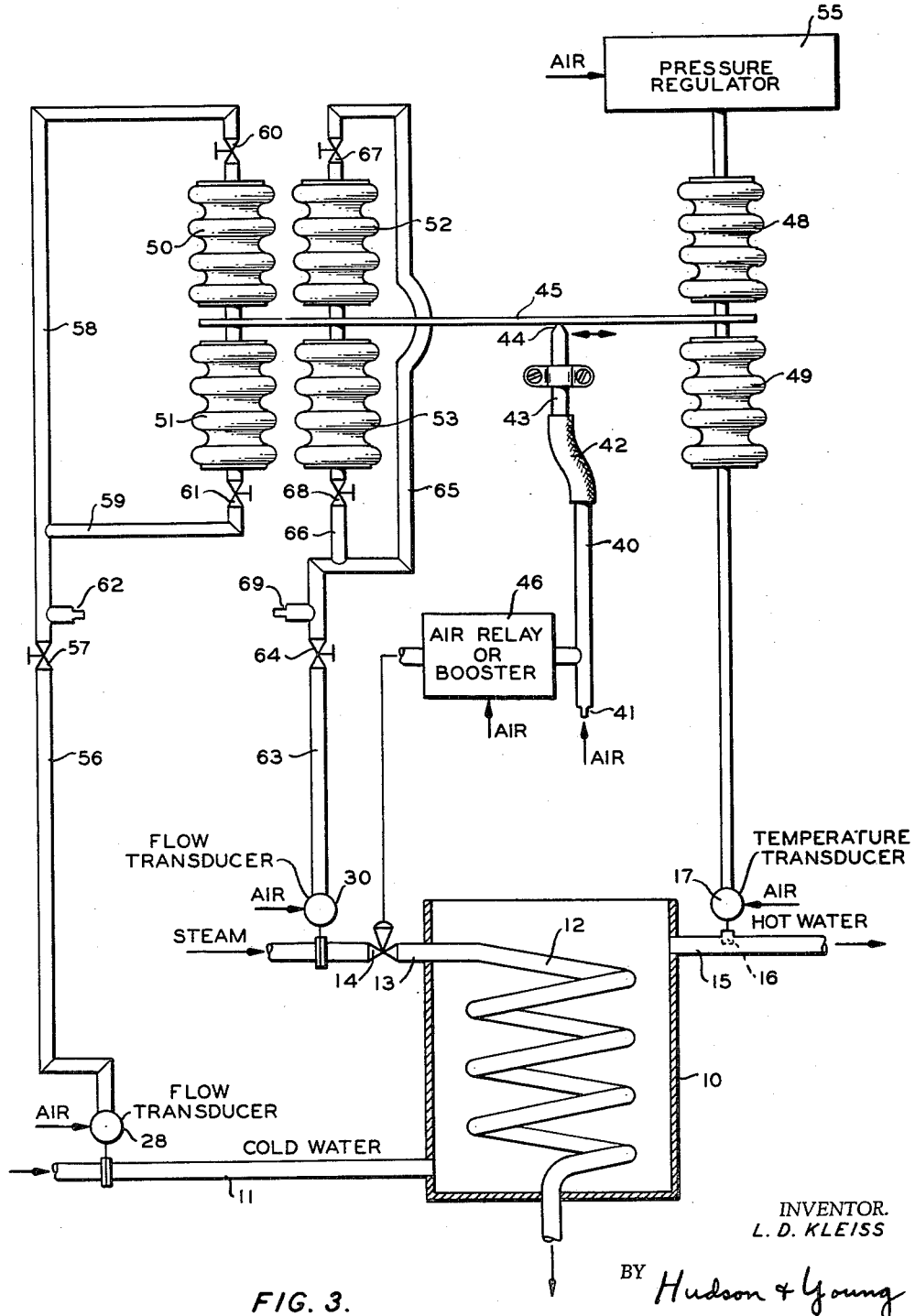
FIGURE 3 is a schematic representation of a pneumatic controller which can be employed in the system of FIGURE 1.

As previously mentioned, the control system of FIGURE 1 can operate by means of pneumatic pressures. An example of such a system is illustrated in FIGURE 3 wherein it is assumed that the temperature of the inlet water to tank 10 does not vary appreciably so that no control is needed for this variable. In the control system of FIGURE 3, air at a constant pressure is supplied to a conduit 40 through a restriction 41. Conduit 40 is connected by a flexible coupling 42 to a conduit 43 which is provided with an outlet nozzle 44 that is partially blocked by a lever 45. The position of lever 45, with respect to nozzle 44, adjusts the rate at which air bleeds out of the nozzle, and thus regulates the pressure in conduit 40. The air pressure in conduit 40 actuates an air relay or booster 46 which supplies an output air pressure that adjusts valve 14.

Lever 45 is connected at one end between first and second bellows 48 and 49. Bellows 48 and 49 are supported at their ends opposite lever 45. The second end of lever 45 is connected between third and fourth bellows 50 and 51 which are also supported at their ends opposite lever 45. Fifth and sixth bellows 52 and 53 engage lever 45 at a point between the second end of the lever and nozzle 44. Bellows 52 and 53 are also supported at their ends opposite lever 45. Transducer 17 provides an output air pressure which is representative of the temperature of the water in conduit 15. This pressure is applied to the interior of bellows 49 so as to tend to expand the bellows to move lever 45 away from nozzle 44. This movement is opposed by the pressure within bellows 48 which is supplied by a pressure regulator 55. The pressure within bellows 48 is representative of the desired temperature of the water in outlet conduit 15. This pressure can be adjusted manually by means of regulator 55. Transducer 28 provides an output air pressure which is representative of the flow rate through inlet conduit 11. This pressure is transmitted by means of a conduit 56, which has a valve 57 therein, to conduits 58 and 59. Conduit 58 communicates through a valve 60 with bellows 50, and conduit 59 communicates through a valve 61 with bellows 51. A restricted vent 62 communicates with conduit 56 between valve 57 and conduits 58 and 59. Transducer 30 provides a pneumatic pressure which is representative of the flow of steam through conduit 13. This pressure is transmitted by a conduit 63, which has a valve 64 therein, to conduits 65 and 66. Conduit 65 communicates through a valve 67 with bellows 52, and conduit 66 communicates through a valve 68 with bellows 53. A restricted vent 69 communicates with conduit 63 between valve 64 and conduits 65 and 66.

For purposes of discussion, it is assumed that the system initially is at balance and an increased outlet water temperature is desired. Pressure regulator 55 is adjusted to increase the pressure in bellows 48. This additional pressure moves lever 45 downwardly to block the escape of air from nozzle 44. The air pressure within conduit 40 thus increases to actuate relay 46 to change the pneumatic pressure applied to valve 14. This pressure further opens the valve to increase the steam flow to coil 12. This increased steam flow is sensed by transducer 30 which provides an increased output pressure. This increased pressure is applied to bellows 53 which provides negative feedback by lifting lever 45 to increase the amount of air which escapes through nozzle 44. The output air pressure of transducer 30 is also applied to bellows 52 which provides positive feedback by moving lever 45 downwardly to block nozzle 44. The magnitudes of these two feedback signals are determined by the horizontal position of nozzle 44 and the degree of opening of valve 64. If valve 64 is nearly shut, the air bleeding therethrough from transducer 30 can escape to the atmosphere through restricted vent 69 so that little or no feedback is applied. However, if valve 64 is opened wider, the increased flow through this valve is greater than the loss through restriction 69 so that the magnitude of the feedback is increased. Valves 67 and 68 restrict the exponential pressure buildup in and feedback from positive feedback bellows 52 and negative feedback bellows 53, respectively. Thus, valve 64 is the proportional band adjustment, valve 68 is the rate adjustment and valve 67 is the reset valve adjustment. When the process is stabilized at the control point, the pressure in bellows 52 balances the pressure in bellows 53 and the pressure in bellows 48 balances the pressure in bellows 49. Lever 45 is then returned to its original position.

Flow transducer 28 and the bellows associated therewith compensate for changes of flow of cold water through conduit 11. If the process experiences a sudden increase in water flow, such increased flow is sensed by transducer 28 which has a reverse action, that is, an increased flow causes a decrease in output air pressure. This decreased air pressure is applied through proportional band valve 57 to cause a decrease in pressure in bellows 51. Bellows 51 contracts so that lever 45 is lowered to increase the pressure in conduit 40. This results in valve 14 being opened to increase the heat supplied to tank 10. Transducer 28 thus anticipates the cooling effect of the increased water supply. The amount of steam increased is held proportional to the amount of water increase by a feedback signal from the steam flow transducer 30. This action dies out as the pressure in bellows 50 slowly equalizes with the pressure in bellows 51. Bellows 50 and 51 thus constitute a memory section whereby the cooling effect of increased cold water flow is computed in terms of the ultimate effect on the process temperature. The temperature effect thus computed is mechanically added by means of lever 45 to the process temperature measurement. A memory of the predicted temperature effect is held in storage and fades out at the same time and rate as the predicted temperature change actually appears in the process. Bellows 52 and 53 perform the same function with respect to variations in steam flow rate.

Figure 4:
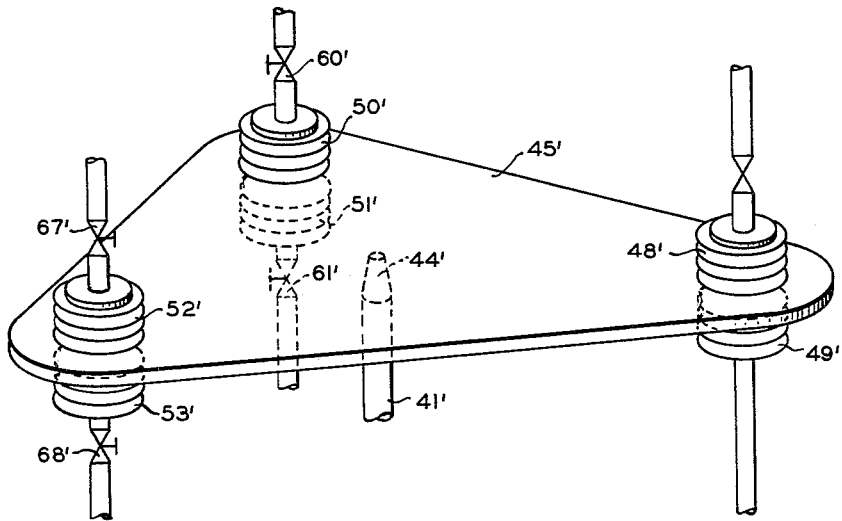
FIGURE 4 illustrates a modified form of the controller of FIGURE 3.

In FIGURE 4, there is shown a modified form of a portion of the pneumatic controller of FIGURE 3. The apparatus of FIGURE 4 differs from that of FIGURE 3 in that lever 45 has been replaced by a generally triangularly shaped plate 45'. A nozzle 44' is adjustably positioned beneath plate 45' so that movement of the plate opens and closes the nozzle. Two positioning bellows are secured to each corner of plate 45'. These bellows are generally similar to those illustrated in FIGURE 3 and corresponding bellows are indicated by like primed reference numerals. The apparatus of FIGURE 4 is somewhat more complicated than that of FIGURE 3 but has an advantage in that the proportional band of each feedback can be varied by shifting the position of nozzle 44'. The proportional band valves 57 and 64 of FIGURE 3 and the restricted vents 62 and 69 can be eliminated from the apparatus of FIGURE 4.

Figure 5:
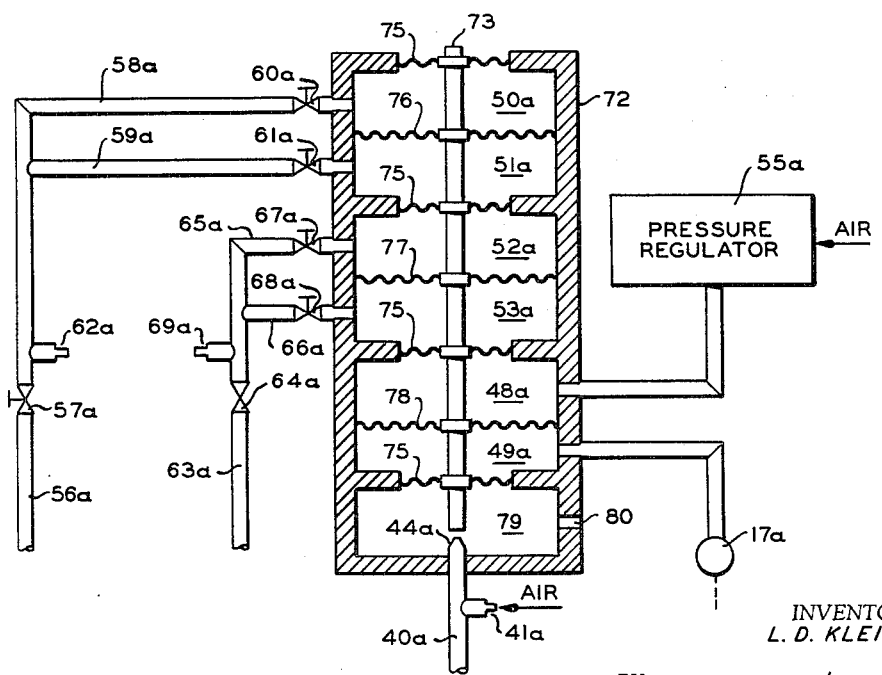
FIGURE 5 illustrates a second modified form of the controller of FIGURE 3.

In FIGURE 5, there is shown a second modification of the pneumatic controller of FIGURE 3. The apparatus of FIGURE 5 comprises a housing 72 which has a spindle 73 mounted therein. The lower end of spindle 73 is normally positioned slightly above a nozzle 44a to restrict the flow of air outwardly through this nozzle. Spindle 73 is attached to housing 72 by a plurality of diaphragms 75 which divide the interior of the housing into a plurality of chambers. The upper three of these chambers are in turn sub-divided into two chambers by means of respective diaphragms 76, 77, and 78 which are also attached to spindle 73. Diaphragm 76 thus forms chambers 50a and 51a; diaphragm 77 forms chambers 52a and 53a; and diaphragm 78 forms chambers 48a and 49a. These chambers correspond to the bellows 50, 51, 52, 53, 48, and 49, respectively, of FIGURE 3. The conduits communicating with these chambers correspond to the conduits which communicate with the bellows of FIGURE 3. The lowermost chamber 79 in housing 72 communicates with atmosphere through a vent 80. The apparatus of FIGURE 5 is constructed so that diaphragms 75 are so small in area in comparison with the larger diaphragms that pressure differentials across diaphragms 75 do not cause a perceptible movement of spindle 73. The pressures in the chambers of the apparatus of FIGURE 5 tend to move spindle 73 in the same manner as the pressures in the corresponding bellows in FIGURE 3 move lever 45. The operation of the controller of FIGURE 5 is thus substantially the same as that of the controller of FIGURE 3.

Figure 6:
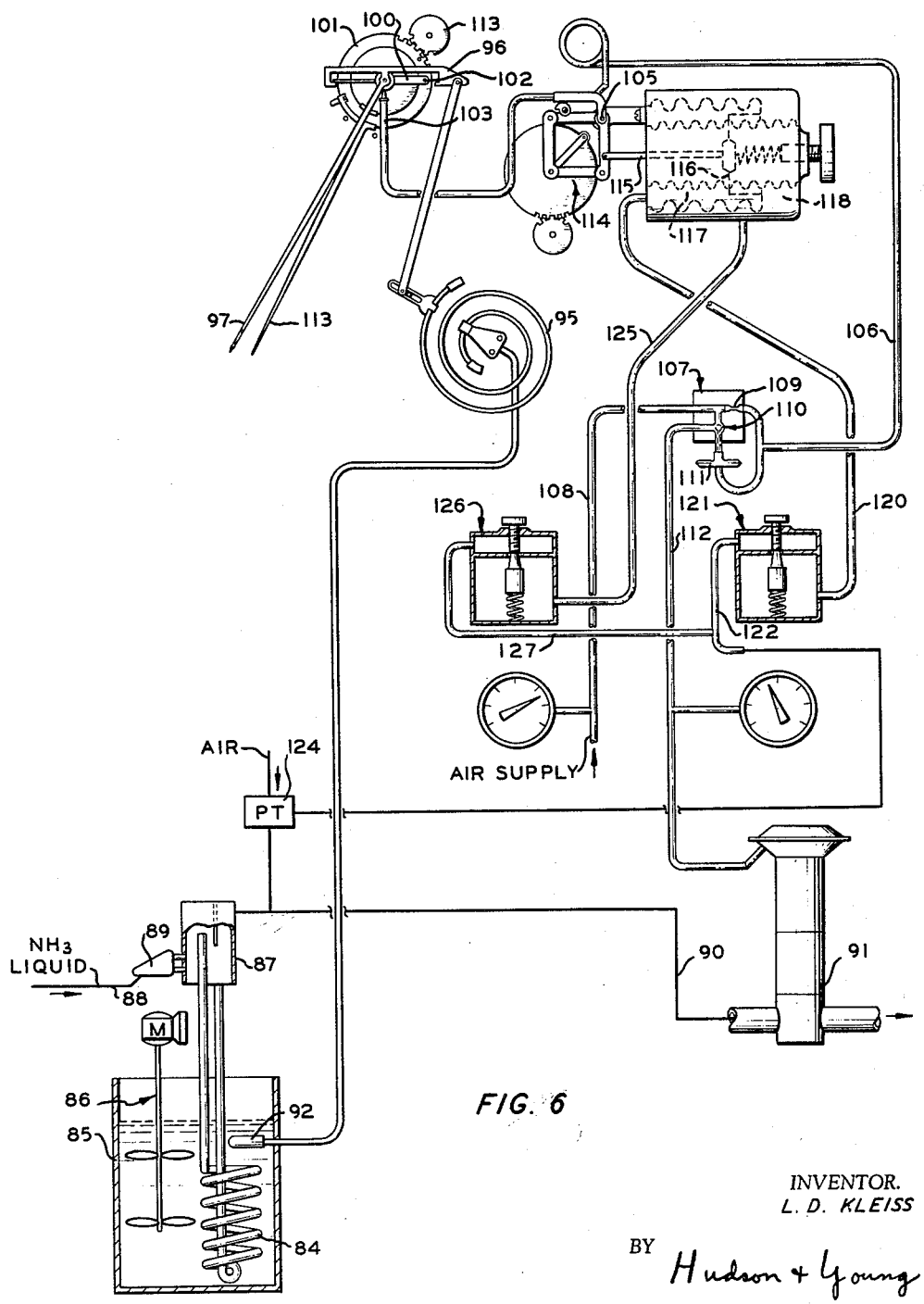
FIGURE 6 is a schematic representation of a commercially available pneumatic controller which has been modified in accordance with the present invention.

In FIGURE 6, there is shown a commercially available pneumatic controller which has been modified in accordance with the present invention. The controller of FIGURE 6 is illustrated in conjunction with a synthetic rubber polymerization reactor 85. The material to be polymerized is agitated in reactor 85 by means of a stirring assembly 86. The reactor is cooled by means of a cooling coil 84 immersed within the polymerization mixture. Liquid ammonia is supplied to a chamber 87 by means of a conduit 88 which communicates with chamber 87 through a float valve 89. The liquid ammonia is directed through coil 84, and the resulting ammonia vapor is removed from chamber 87 through an outlet conduit 90. A control valve 91 is disposed in conduit 90. A temperature sensing element 92 is disposed in reactor 85, and a pressure responsive transducer 124 is connected to outlet conduit 90.

Temperature sensing element 92 can be a fluid filled bulb which communicates with a Bourdon spring 95. The free end of spring 95 is connected to an arm 96 which is pivotally mounted at a point near its center and which carries a pen arm 97 that marks on a recording chart, not shown. A baffle 100 is pivotally attached to a circular disk 101 at a point 102. This baffle is engaged by the left hand edge of arm 96. The center portion of baffle 100 is positioned immediately above a nozzle 103 so that the position of the baffle regulates the opening of nozzle 103. Nozzle 103 is pivotally mounted at a point 105. Nozzle 103 is connected by a conduit 106 to an air relay assembly 107. A source of air pressure is connected by means of a conduit 108 through a restriction 109 in assembly 107 to conduit 106. Conduit 108 is also connected through a ball operated valve 110 to control valve 91. Ball valve 110 is actuated by the pressure in a capsule 111 which communicates with conduit 106.

The operation of the controller thus far described should now become apparent. If the temperature in reactor 85 should decrease below the desired set point, for example, the pressure transmitted by element 92 decreases so that Bourdon spring 95 tends to become more coiled. This pivots arm 96 in a counterclockwise direction so that baffle 100 tends to close nozzle 103. The air pressure in conduit 106 increases so that capsule 111 is inflated to move the ball upwardly to block communication between conduits 108 and 112. The resulting pressure decrease in conduit 112 permits valve 91 to be moved toward a closed position so that less ammonia vaporizes in coil 84. This decreases the amount of cooling provided by coil 84.

The initial set point of the control system can be adjusted by means of a knob 113 which rotates disk 101 to raise or lower pivot point 102. This point is indicated by an arm 113 which is attached to disk 101. Nozzle 103 is also positioned with respect to baffle 100 by means of a parallelogram linkage 114 which serves to rotate nozzle 103 about pivot point 105. This linkage is connected by a rod 115 to a movable diaphragm 116. The pressure in a first chamber 117 tends to push diaphragm 116 to the right, and the pressure in a second chamber 118 tends to push the diaphragm to the left. Chamber 117 is connected by a conduit 120, an adjustable valve 121 and a conduit 122 to a pressure transducer 124 which provides an output pneumatic pressure representative of the pressure in conduit 90. Chamber 118 is connected by a conduit 125, an adjustable valve 126 and a conduit 127 to pressure transducer 124.

Pressure transducer 124 is employed to sense fluctuations in pressure of the exhaust ammonia vapors. If the pressure should increase in conduit 90, for example, due to valve 91 closing, the output pressure from transducer 124 increases so as to increase the pressure in chamber 117. This moves rod 115 toward the right so that nozzle 103 pivots counterclockwise about point 105. This permits a greater loss of pressure in conduit 106 so that capsule 111 is deflated. Increased air pressure is then applied to conduit 112 from conduit 108 to open valve 91 by an amount sufficient to restore the pressure in conduit 90 to the corrected value. The output pressure of transducer 124 is applied through valve 126 to chamber 118. The pressure in chamber 118 opposes the pressure in chamber 117, thereby providing positive feedback. The time of response of this system can be varied by adjustment of valves 126 and 121 which control the rate of pressure increase in chambers 118 and 117. The apparatus of FIGURE 6 thus provides both a primary and a secondary control over variables which influence the temperature of the reactor.

Figure 7:
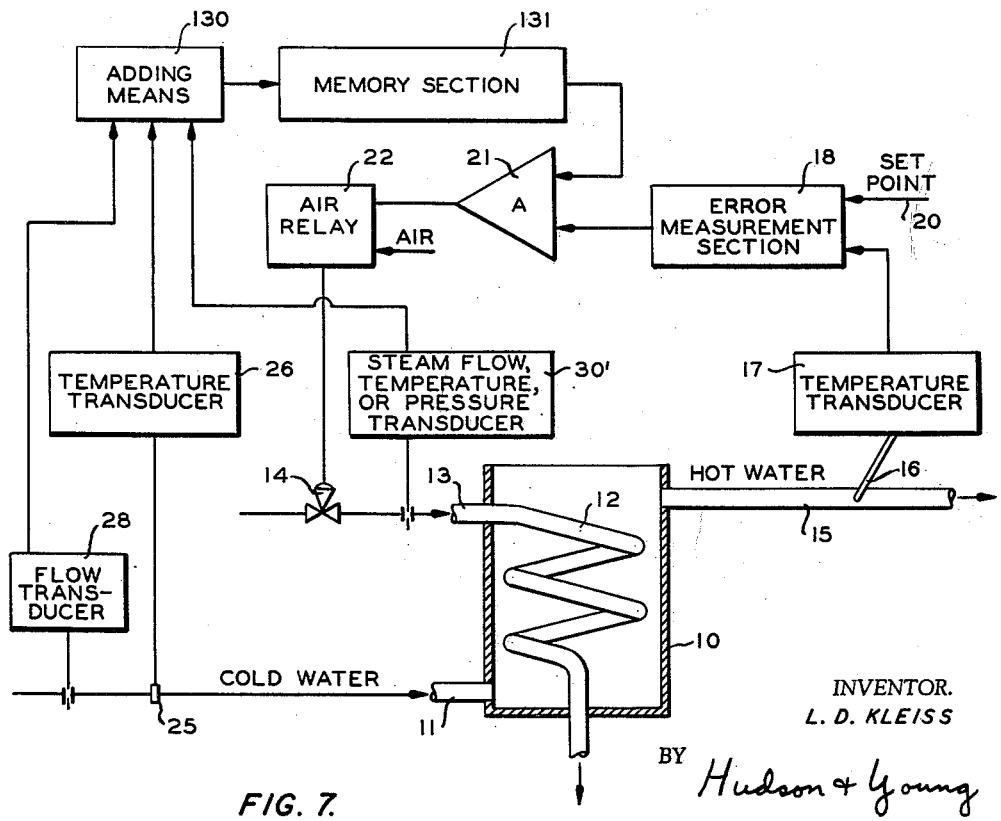
FIGURE 7 is a schematic representation of a simplified embodiment of the control system of FIGURE 1.

In FIGURE 7, there is shown a modified form of the controller of FIGURE 1. This controller requires only a single memory section. No internal feedback is employed in this particular application because the steam flow response is assumed to be instantaneous in comparison with the remainder of the process response. Transducers 26 and 28 provide output signals which are representative of the temperature and rate of flow of the water supplied to tank 10 through conduit 11. A transducer 30' provides an output signal which is representative of either steam, flow rate, temperature or pressure. The three signals are applied to a suitable adding means 130. These three signals must be scaled so that an equal output of each analog has an equal effect on the outlet water temperature. This scaling or gain adjustment can be done either at the transducer or at the adding means. Electrically, the summing can be accomplished by individual input resistors to a common circuit point. Pneumatically, the summing can be accomplished by summing relays. If all of the feedback variables have the same process response with respect to time, adjustment of the memory section 131 is relatively simple. If the several variables have different process responses with respect to time, a compromise adjustment by the memory section is necessary. However, even an approximate anticipation is usually better than none at all. This apparatus reduces the number of memory sections required.

Figure 8:
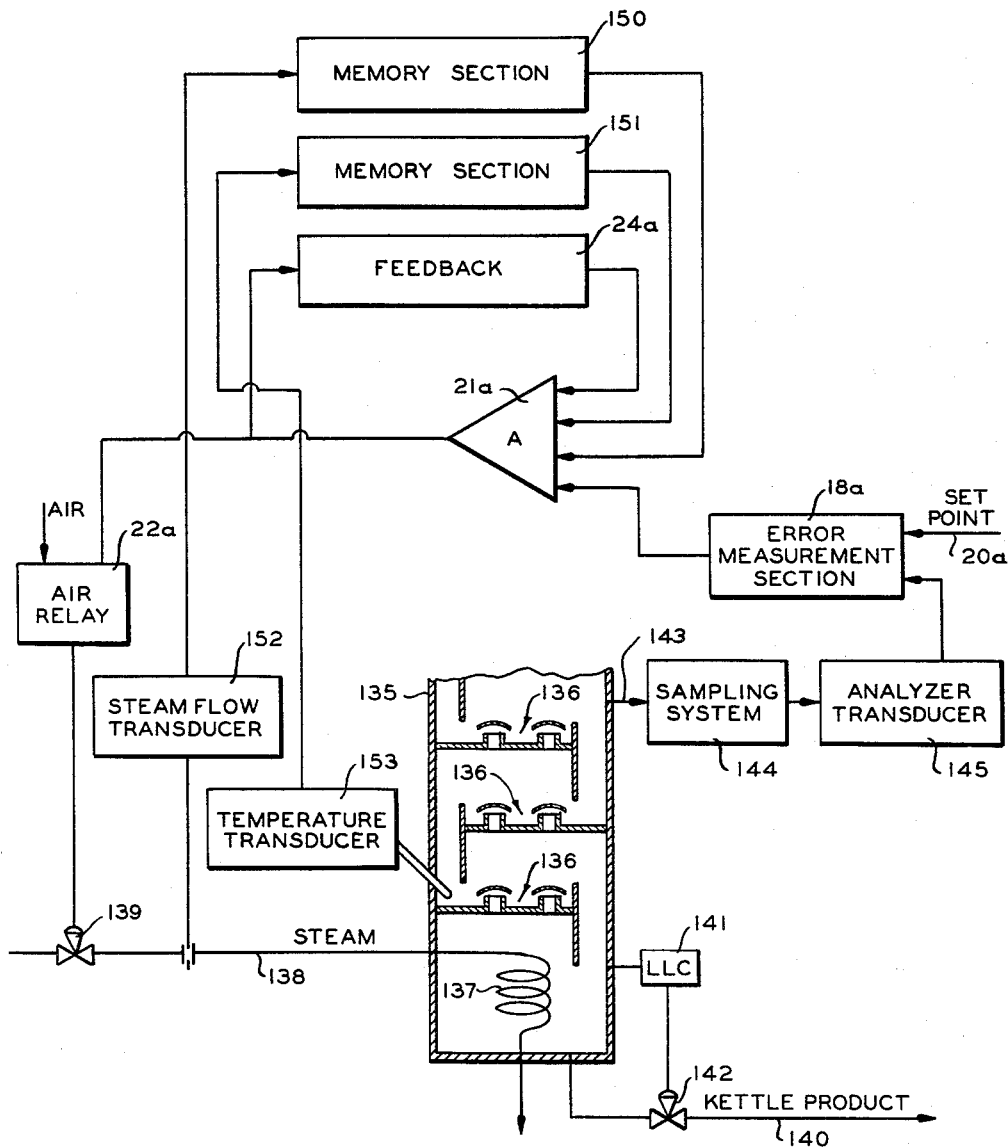
FIGURE 8 is a schematic representation of a fractionation column control system utilizing the controller of this invention.

Another application of the improved controller of this invention is to divide a long process control loop into a number of shorter loops. The advantage of shortening a control loop is obvious in that shorter control loops permit faster recovery from process upsets and permit closer regulation without instability. The control loop in the water heating processes previously described is shortened because the effects of process variables are anticipated before they are detected in the output water temperature. In FIGURE 8, there is shown an application of the controller of this invention to regulate a fractionation column. The lower region of such a column 135 is illustrated schematically. This column includes a plurality of bubble decks 136 at which the liquids and vapors in the column contact one another. A steam coil 137 is disposed in the lower region of column 135 to provide heat. Steam is introduced into coil 137 through an inlet conduit 138 which has a control valve 139 therein. The rate of kettle product withdrawal from the column through a conduit 140 is regulated by a liquid level controller 141 which adjusts a valve 142 in conduit 140. A fluid sample is withdrawn from the lower region of column 135 through a conduit 143 which communicates with a sampling system 144. This fluid is transmitted to an analyzer-transducer 145 which provides an output signal that is representative of the composition of the sample stream. This signal is applied to an error measuring section 18a which is analogous to the corresponding section employed in the controller of FIGURE 1. The output signal from measurement section 18a is applied through an amplifier 21a and a relay 22a to control valve 139. Amplifier 21a is provided with an internal feedback section 24a and with feedback memory sections 150 and 151. Memory section 150 is actuated by a flow transducer 152 which measures the rate of steam flow to coil 137. Memory section 151 is actuated by a temperature transducer 153 which measures the temperature in the lower region of column 135.

If the set point 20a of measurement section 18a is increased, for example, the resulting output signal from measurement section 18a serves to open control valve 139 a given amount. This increases the steam flow into coil 137. The increased steam vaporizes more of the liquid in the column and thus changes compositions on each tray in sequence. In the absence of the memory sections, there is a substantial delay in the operation of the control system because the composition change must move slowly upwardly through the column to the sample point. However, with the use of steam flow transducer 152, an immediate adjustment is made if the steam flow to the column is not as anticipated. This constitutes the first subdivision of the control loop. The increased vaporization from the additional steam changes the composition and temperature at the lower tray in column 135. Memory section 150 predicts when and how much the temperature above this tray is to be increased. Negative feedback of the output signal from transducer 153 changes the controller output if needed to change the steam flow. This constitutes the second subdivision of the control loop. The composition change progresses up the column tray-by-tray. The change measured by analyzer 145 resets valve 139 to form the third subdivision of the control loop. The dynamic performance of this subdivision control system is vastly superior to that of a single loop because of rapid detection and correction of errors in control assumptions. This control system can be improved even further if memory sections and feedback are provided to receive analogs of column reflux and feed conditions because these quantities also affect composition at sample line 143.

From the foregoing description, it should be evident that there is provided in accordance with this invention, an improved type of process controller. This controller is characterized by its ability to receive one or more external signals in addition to the negative feedback from the element measuring variable. The controller employs one or more memory sections to compute the future effect of variables represented by these signals on the controlled variable. The quality of control provided compares favorably to that provided by more costly and complex cascade and ratioed input control systems. The controller of this invention can be constructed by modifying existing equipment, and it can use either electrical or pneumatic signals.

While the invention has been described in conjunction with present preferred embodiments, it should be evident that it is not limited thereto.

What is claimed is:

1. A process controller comprising a nozzle, conduit means having a restriction therein communicating with said nozzle, means to apply a pneumatic pressure to said conduit means so that said restriction is between said nozzle and the source of pneumatic pressure, a flapper adapted to move toward and away from said nozzle to vary the opening thereof, means to so move said flapper responsive to a first signal representative of a process condition to be regulated, means to position said flapper initially with respect to said nozzle, means responsive to the pressure in said conduit means between said restriction and said nozzle to provide an output control signal, a first pressure chamber connected to said flapper to urge said flapper toward said nozzle when the pressure in said first chamber is increased, a second pressure chamber connected to said flapper to urge said flapper away from said nozzle when the pressure in said second chamber is increased, a first conduit adapted to receive a pressure representative of a measured condition, said first conduit being independent of said conduit means, a second conduit having a first valve therein communicating between said first conduit and said first chamber, and a third conduit having a second valve therein communicating between said first conduit and said second chamber.

2. The controller of claim 1, further comprising a third valve in said first conduit, and a vent communicating with said first conduit between said third valve and said second and third conduits.

3. A process controller comprising a nozzle, conduit means having a restriction therein communicating with said nozzle, means to apply a pneumatic pressure to said conduit means so that said restriction is between said nozzle and the source of pneumatic pressure, a flapper adapted to move toward and away from said nozzle to vary the opening thereof, means to so move said flapper responsive to a first signal representative of a first process condition to be regulated, means to position said flapper initially with respect to said nozzle, means responsive to the pressure in said conduit means between said restriction and said nozzle to provide an output control signal, a first bellows positioned on one side of said flapper to urge said flapper away from said nozzle when expanded, a second bellows positioned on the second side of said flapper to urge said flapper toward said nozzle when expanded, means to establish a second penumatic pressure which is representative of a second process condition which influences the process to be controlled, first valved conduit means communicating between said second pneumatic pressure and said first bellows, and second valved conduit means communicating between said second pneumatic pressure and said second bellows.

4. A process controller comprising a nozzle, conduit means having a restriction therein communicating with said nozzle, means to apply a pneumatic pressure to said conduit means so that said restriction is between said nozzle and the source of pneumatic pressure, a flapper adapted to move toward and away from said nozzle to vary the opening thereof, means to so move said flapper responsive to a first signal representative of a first process condition to be regulated, means to position said flapper initially with respect to said nozzle, means responsive to the pressure in said conduit means between said restriction and said nozzle to provide an output control signal, a first bellows positioned on one side of said flapper to urge said flapper away from said nozzle when expanded, a second bellows positioned on the second side of said flapper to urge said flapper toward said nozzle when expanded, means to establish a second pneumatic pressure which is representative of a second process condition which influences the process to be controlled, first valved conduit means communicating at one end with said second pneumatic pressure, a restricted vent in said first valved conduit means between the valve therein and the second end, second valved conduit means communicating between said first bellows and the second end of said first valved conduit means, and third valved conduit means communicating between said second bellows and the second end of said first valved conduit means.

5. A process controller comprising a nozzle, conduit means having a restriction therein communicating with said nozzle, means to apply a pneumatic pressure to said conduit means so that said restriction is between said nozzle and the source of pneumatic pressure, a generally triangularly shaped flapper adapted to move toward and away from said nozzle to vary the opening thereof, first, second and third bellows positioned adjacent individual corners of said flapper on one side thereof to tend to move said flapper away from said nozzle when expanded, fourth, fifth and sixth bellows positioned on the second side of said flapper opposite said first, second and third bellows, respectively, to move said flapper toward said nozzle when expanded, means to apply a pressure to said first bellows representative of a desired set point, means to apply a pressure to said fourth bellows representative of a first process condition to be regulated, individual valved conduit means to apply pressures to said second and fifth bellows representative of a second process condition which influences the process to be controlled, individual valved conduit means to apply pressures to said third and sixth bellows representative of a third process condition which influences the process to be controlled, and means responsive to the pressure in said first-mentioned conduit means between said restriction and said nozzle to provide an output control signal.

6. A process controller comprising a nozzle, conduit means having a restriction therein communicating with said nozzle, means to apply a pneumatic pressure to said conduit means so that said restriction is between said nozzle and the source of pneumatic pressure, a flapper adapted to move toward and away from said nozzle to vary the opening thereof, first and second chambers separated by a first diaphragm, third and fourth chambers separated by a second diaphragm, means connecting said diaphragms to said flapper so that increased pressures in said first and third chambers move said flapper away from said nozzle and increased pressures in said second and fourth chambers move said flapper toward said nozzle, means responsive to a first signal representative of a first process condition to be regulated to apply a pressure to said first chamber, means to apply a pressure to said second chamber representative of a desired set point, individual valved conduit means to apply pressures to said third and fourth chambers which are representative of a second process condition which influences the process to be controlled, and means responsive to the pressure in said first-mentioned conduit means between said restriction and said nozzle to provide an output control signal.

7. A process controller comprising error measuring means adapted to receive a first signal representative of a first process condition to be regulated and a second signal representative of a predetermined set point and to establish an output signal which is representative of the difference between said first and second signals; inlet means, independent of said first and output signals, adapted to receive a third signal which is representative of a second process condition; first adjusting means responsive to a third signal received by said inlet means to vary said output signal as a direct function of said third signal; means to vary the rate at which said output signal is varied by said first adjusting means; second adjusting means responsive to a third signal received by said inlet means to vary said output signal as an inverse function of said third signal; and means to vary the rate at which said output signal is varied by said second adjusting means.

8. A process control system comprising error measuring means adapted to receive a first signal representative of a first process condition and a second signal representative of a predetermined set point and to establish an output signal which is representative of the difference between said first and second signals, inlet means adapted to receive a third signal, first adjusting means responsive to a third signal received by said inlet means to vary said output signal as a direct function of said third signal, means to vary the rate at which said output signal is varied by said first adjusting means, second adjusting means responsive to a third signal received by said inlet means to vary said output signal as an inverse function of said third signal, means to vary the rate at which said output signal is varied by said second adjusting means, means to measure a first process condition and to establish said first signal representative thereof, means to apply said first signal to said error adjusting means, means to measure a second process condition and to establish said third signal representative thereof, means to apply said third signal to said inlet means, and means to adjust a variable of the process in response to said output signal.

9. In a system wherein a zone is to be maintained at a preselected temperature, conduit means in heat exchange with said zone, means to introduce a liquid into said conduit means so that vaporization of said liquid in said conduit means cools said zone, error measuring means adapted to receive a first signal representative of a first process condition and a second signal representative of a predetermined set point and to establish an output signal which is representative of the difference between said first and second signals, inlet means adapted to receive a third signal which is representative of a second process condition, first adjusting means responsive to a third signal received by said inlet means to vary said output signal as a direct function of said third signal, means to vary the rate at which said output signal is varied by said first adjusting means, second adjusting means responsive to a third signal received by said inlet means to vary said output signal as an inverse function of said third signal, means to vary the rate at which said output signal is varied by said second adjusting means, means to measure the temperature of said zone and to establish said first signal representative thereof, means to apply said first signal to said error measuring means, means to measure the pressure of the vapor removed from said conduit means and to establish said third signal representative thereof, means to apply said third signal to said inlet means, and means to adjust the rate at which said liquid is vaporized in said conduit means in response to said output signal.

References Cited in the file of this patent

UNITED STATES PATENTS

| 2,261,343 | De Florez et al. | Nov. 4, 1941 |
| 2,273,103 | Harrison | Feb. 17, 1942 |
| 2,361,885 | Tate et al. | Oct. 31, 1944 |
| 2,703,679 | Shank et al. | Mar. 8, 1955 |
| 2,817,213 | Miner | Dec. 24, 1957 |
| 2,935,077 | Keyser | May 3, 1960 |
| 2,993,348 | Boyle | July 25, 1961 |

OTHER REFERENCES

Barnard: "Instruments," February 1949, vol. 22, article entitled "The ABC's of Multi-Element Control" (pages 179 to 181, copy in Group 380, Class 236–82 Pub.).